United States Patent
Zock et al.

(10) Patent No.: US 11,123,661 B2
(45) Date of Patent: Sep. 21, 2021

(54) METHOD OF FORMING A COMPOST FILTER SOCK

(71) Applicant: MKB Company, LLC, Groveport, OH (US)

(72) Inventors: Michael A. Zock, Saxonburg, PA (US); Jeffrey Karl Szebalskie, Mars, PA (US)

(73) Assignee: MKB COMPANY, Groveport, OH (US)

( * ) Notice: Subject to any disclaimer, the term of this patent is extended or adjusted under 35 U.S.C. 154(b) by 95 days.

(21) Appl. No.: 15/790,208

(22) Filed: Oct. 23, 2017

(65) Prior Publication Data

US 2019/0388806 A1 Dec. 26, 2019

Related U.S. Application Data

(60) Provisional application No. 62/411,000, filed on Oct. 21, 2016.

(51) Int. Cl.
*B01D 24/00* (2006.01)
*B01D 39/04* (2006.01)
(Continued)

(52) U.S. Cl.
CPC .......... *B01D 24/22* (2013.01); *B01D 24/001* (2013.01); *B01D 39/04* (2013.01); *B65B 1/06* (2013.01);
(Continued)

(58) Field of Classification Search
CPC ...... B01D 24/22; B01D 39/04; B01D 24/001; B01D 2239/0266; B01D 2239/10; B01D 2101/00; B01D 2239/0283; B01D 2239/1241; B01D 29/828; B01D 29/27; B01D 24/042; B01D 2221/12; B65B 1/06;
(Continued)

(56) References Cited

U.S. PATENT DOCUMENTS 2,071,779 A  2/1937  Willing
2,201,279 A  5/1940  Willing
(Continued)

OTHER PUBLICATIONS

Faucette et al, Erosion control and storm water quality from straw with PAM, mulch, and compost blankets of varying particle sizes, Journal of Soil and Water Conservation, vol. 62, No. 6, pp. 404-413. (Year: 2007).*

(Continued)

*Primary Examiner* — Matthew O Savage
(74) *Attorney, Agent, or Firm* — Brynn L. Shideler; Krisanne Shideler; BLK Law Group

(57) ABSTRACT

A hybrid filtration sock comprises a mesh tube filled with a blended filler comprising 60%-90% fibrous volumizing filler and 10%-40% woody organic filler. The fibrous volumizing filler 12 includes straw, grasses, pine straw, corn stalks, natural fibers and weeds and combinations thereof. The woody organic filler is ground or chipped wood based material from land clearing, yard waste, pallets and clean wood debris or clean wood scraps, comprising a PH of between 5.0 and 8.0, with a particle size wherein 99% passes a 2 in (50 mm) sieve and a maximum of 43% passes a ⅜ in (9.5 mm) sieve, and <3.5% by dry weight of inert or foreign man made materials.

19 Claims, 1 Drawing Sheet

(51) Int. Cl.
  *B65B 1/06* (2006.01)
  *B65B 1/08* (2006.01)
  *B65B 1/12* (2006.01)
  *B01D 24/22* (2006.01)
  *C02F 103/00* (2006.01)
  *B01D 24/04* (2006.01)

(52) U.S. Cl.
  CPC .................. *B65B 1/08* (2013.01); *B65B 1/12* (2013.01); *B01D 24/042* (2013.01); *B01D 2101/00* (2013.01); *B01D 2221/12* (2013.01); *B01D 2239/0266* (2013.01); *B01D 2239/0283* (2013.01); *B01D 2239/10* (2013.01); *C02F 2103/001* (2013.01)

(58) Field of Classification Search
  CPC .. B65B 1/08; C02F 1/286; C02F 3/327; C02F 2103/001; E02D 31/06
  USPC ........................................... 405/302.6, 302.7
  See application file for complete search history.

(56) References Cited

U.S. PATENT DOCUMENTS

| | | | |
|---|---|---|---|
| 3,617,566 A | 11/1971 | Oshima et al. | |
| 3,739,913 A | 6/1973 | Bogosian | |
| 4,044,525 A | 8/1977 | Forsgren | |
| 4,366,067 A | 12/1982 | Golding et al. | |
| 4,659,478 A | 4/1987 | Stapelfeld et al. | |
| 5,249,889 A * | 10/1993 | Sierzega | A01G 2/00 405/129.1 |
| 7,452,165 B2 * | 11/2008 | Tyler | E02B 3/125 405/302.6 |
| 7,654,292 B2 | 2/2010 | Sweningson | |
| 2007/0269275 A1* | 11/2007 | Kimberlin | E02D 17/20 405/302.6 |
| 2008/0019780 A1* | 1/2008 | Hastings | E02D 29/0291 405/302.6 |
| 2015/0047298 A1 | 2/2015 | Szebalskie, Sr. et al. | |
| 2015/0299012 A1 | 10/2015 | Greco et al. | |
| 2016/0279541 A1 | 9/2016 | Zock et al. | |

OTHER PUBLICATIONS https://siltsaver.com/products/wattles/ , Travel Lane Wattle, 2019.
BEG Group LLC, Big Switch® & Phalanx Bio Switch™ Specification Sheet, https://custom.secureserver.net/Review/2018_12/25dd23a3-29d5-4415-bc8b-7ca47cddf442PBS%20and%20Big%20Switch%20Sock%20%20Spec.pdf, Dec. 25, 2018.

* cited by examiner

METHOD OF FORMING A COMPOST FILTER SOCK

RELATED APPLICATIONS

This application claims priority to U.S. Patent Application Ser. No. 62/411,000, filed Oct. 21, 2016 entitled "Hybrid Filtration Sock and Method of Making Same" which is incorporated herein by reference.

BACKGROUND INFORMATION

1. Field of the Invention

The present invention relates to erosion control compost filter socks and more particularly to hybrid filtration socks and a method of forming the same.

2. Background Information

A compost filter sock (also called a compost filter sleeve, or silt sleeve, or filter sock, compost filter tube, compost mesh sleeve, or similar terms) is a type of contained compost filter berm. A compost filter sock is a mesh tube or netting sleeve filled with mostly biodegradable material, often called compost material, and that is conventionally placed perpendicular to sheet-flow runoff to control erosion and retain sediment in disturbed areas.

The reference to the material within the sleeve as "compost material" has caused some confusion in the art as it is not clear from even the users of the phrase if this is requiring the material to undergo a certain amount of composting prior to being placed in the tube or sleeve, or describing the biodegradable aspect of the material after it has entered the sleeve or tube. The latter seems to be more accurate as the industry often utilizes freshly chipped or ground wood products as "compost material" without any designated pre-filling composting time. The industry also utilizes biodegradable products that actually have undergone some composting prior to use as a filler in a compost filter sock. Further adding to the uncertainty, there are some standard organizations, such as US Composting Council's Seal of Testing Assurance Program ('STA') compost standard specifications, that help define best practices for composting and help define acceptable composted material, and the compost filter sock manufacturers may obtain the certification from such groups for the material that is composted prior to use, but that certification of their "pre-composted" compost filler material does not typically limit their filler material to only such pre-composted material. Another factor adding to the confusion of the actual meaning of conventional "compost filler material" for compost filter sock is a reoccurring reference by some manufacturers and some regulatory agencies to federal guidelines for composting, which sounds reasonable, except the reference is typically to federal guidelines for composting of sludge from sewage water treatment plants (40 cfr 503 Standards for the use or disposal of sewage sludge) that does not generally extend to the present field. In an effort to avoid such confusion, as used herein, the phrase "compost material" associated with compost filter sock will suggest material that has or can be composted or biodegradable material, which will include both material that has been pre-composted and compostable material.

The idea of a compost filter sock formed as a mesh tube filled with compost material as the filler goes at least as far back as 1935 in a patent application by Mark S. Willing for a "means for preventing soil erosion." At that time, the time of the "dust bowl" in the central United States, soil erosion was a big problem in the United States and wind and water erosion was destroying large swaths of cropland. Mr. Willing's early compost filter sock patents numbers U.S. Pat. Nos. 2,079,779 and 2,201,279, which are incorporated herein by reference, disclosed the use of brush or bundled weeds (which can also be called straw) as the compost filler for these early filter socks.

Over the years improvements have been developed giving further detail to filler material, opening size in the sleeve or mesh, length and size of filters, installation instructions. See, for example U.S. Pat. No. 3,957,098, which is incorporated herein by reference, disclosing a 1972 development of an erosion control bag having a porosity of 10 to 35 cubic feet per minute so that air and water may escape from the bag as water and a filler are pumped into the bag.

U.S. Pat. No. 4,044,525, which is incorporated herein by reference, discloses a 1975 development wherein wood chips are blown from the discharge tube of the wood chipper straight into a tube-like package which has perforated walls allowing the air carrying the wood chips to escape from the package while the chips are retained inside the package.

The analogous oil skimming/spill absorbing field, which used absorbent material (including compostable material) in netting, has also yielded improvements relevant to compost filter socks as evidenced in U.S. Pat. Nos. 3,617,566, 3,739,913, 4,366,067, and 4,659,478, which are incorporated herein by reference.

Within the last 30 years, tubular compost filter socks filled with fibrous filler (e.g. straw) or chipped or ground woody filler have been introduced. Some of the people doing work early in the evolution and proliferation and re-introduction of modern compost filter sock were John Engwer at Filter-Mitt, Kevin Lane at Lane ECS, Tom Truelsen at Soil Tek, Rod Tyler at Filtrexx, Keith and Kevin Weaver at Weaver Express, and Doug Cadwell at River Valley Organics. Soon a "modern day" tubular mesh fabric holding in place the berm material was introduced and the term "Compost Filter Sock" began to be used. Today's compost filter sock is a modern day version of the original Willing patents. For a more detailed background on compost filter socks in general see U.S. Patent Publications 2016-0279541 and 2015-0047298, which are incorporated herein by reference.

Blower trucks have been used for mobile in-situ filling of compost filter socks. Blower trucks represent a considerable expense and are not applicable for all terrains. Additionally a portable hopper and auger feeder design has been used for in-situ construction of compost filter socks. A conventional auger system is shown in U.S. Pat. No. 7,654,292, which is incorporated herein by reference.

One type of compost filter sock uses conventional mesh netting filled with a fibrous filler such as straw or the like, see for example the pine straw filled "travel lane wattle" available from Foster Supply, Inc. http://www.fostersupply.com/Products/Erosioncontrol/TravelLaneWattles.aspx Similarly U.S. Patent Publication 2015-0299012, which is incorporated herein by reference, teaches a "biodegradable runoff filter" or compost filter sock in which the sock is filled with fibrous material selected from the group consisting of: switchgrass, pine needles, corn stalks, miscanthus, and combinations thereof. See also the BIG SWITCH™ based fibrous switchgrass filled compost filter sock from the BEG group of Ohio. http://www.thefacilitators.net/the-big-switch-filtration-erosion-product.html.

The known fibrous filled compost filter socks are often used at worksites entry/exit points or travel lanes, and have been called travel lane wattles as noted above. The fibrous filled compost filter socks typically have used fillers from the group comprising grasses (including switchgrass and miscanthus), pine straw (AKA pine needles), corn stalks, weeds, plant stalks and combinations thereof. The water shedding aspects of the fibrous filler is advantages for travel lane usage, however they are certainly not limited to this usage.

Known fibrous filled compost filter socks have presented difficulty in use and in manufacture. Specifically the low weight of the fibrous filling has led to the need to anchor the known fibrous filled compost filter socks. If stakes are not appropriate for the particular usage, the known fibrous filled compost filter socks can have sandbags added to the interior to provide sufficient weight such that the fibrous filled compost filter socks stays in place. The inclusion of sandbags, however, is labor intensive in manufacture, yields an uneven weight distribution, and interferes with the operation of the filtration operation of the sock in the location of the sandbag. Additionally the known fibrous filling material does not lend itself well to either pneumatic blowers or augers, both methods of which have been commonly used for filling compost filter socks as noted above. When the material is not suited for pneumatic blowers or augers, then it is typically hand filled which is very labor intensive.

There remains a need in the art for a fibrous filler containing compost filter sock and method of making same that overcomes these existing deficiencies.

SUMMARY OF THE INVENTION

One aspect of this invention is directed to a "hybrid filtration sock" comprising a mesh tube filled with a blended filler comprising 60%-90% "fibrous volumizing filler" and 10%-40% "woody organic filler".

One aspect of this invention is directed to a method of forming a hybrid filtration sock comprising the steps of blending 60%-90% fibrous volumizing filler and 10%-40% woody organic filler within a conveying mixing auger and conveying the blended filler into a mesh tube.

Within the meaning of this application, the phrase "hybrid filtration sock" is defined as a compost filter sock having a mesh sleeve or tube and organic filler in which the organic filler includes a blending of substantial amounts of at least fibrous volumizing filler and woody organic filler.

Within the meaning of this application, the phrase "fibrous volumizing filler" is defined as a biodegradable filling material comprising straw (defined broadly herein as the dried stalk of a plant, including grain straws such as wheat straw, barley straw, oat straw, and rye straw), grasses (including switchgrass and miscanthus), pine straw (AKA pine needles), corn stalks, natural fibers (such as flax, hemp, sisal, jute, kenaf, bamboo, coir, catgut, wool, alpaca hair, mohair, fique and rattan) and weeds and combinations thereof.

Within the meaning of this application, the phrase "woody organic filler" will mean ground or chipped wood based material from land clearing, yard waste, pallets and clean wood debris or clean wood scraps, comprising a PH of between 5.0 and 8.0 at time of manufacture of the hybrid filtration sock, with a particle size wherein 99% passes a 2 in (50 mm) sieve and a maximum of 43% passes a ⅜ in (9.5 mm) sieve, and <3.5% by dry weight of inert or foreign man made materials. For example, a common woody organic filter is wood chipped to between ½" and 2" in particle size.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

Figure 1:
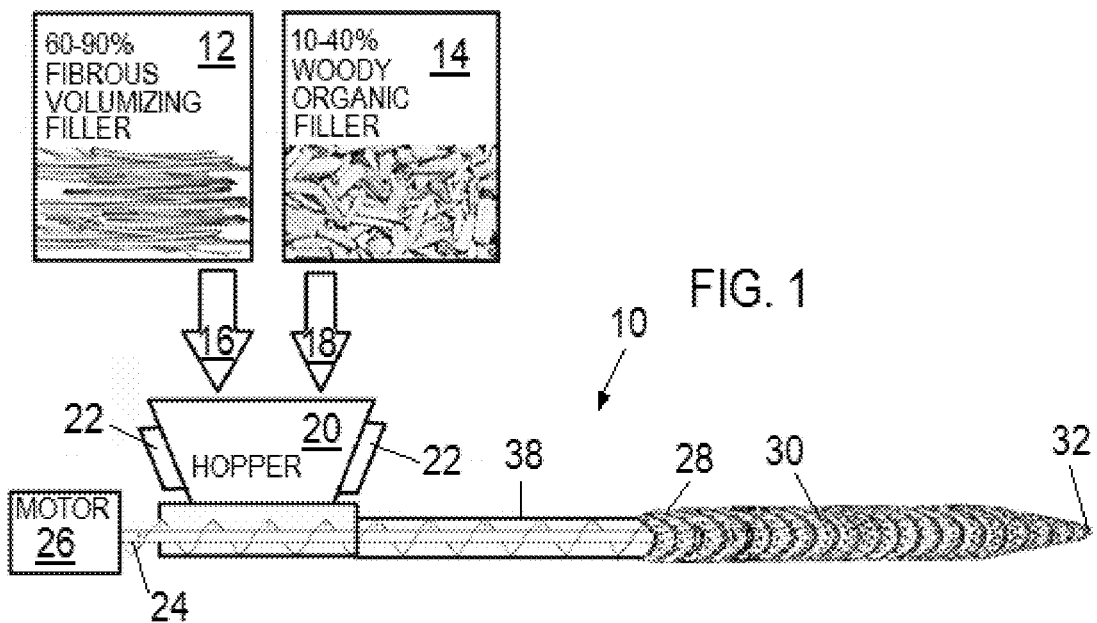
FIG. 1 schematically illustrates hybrid filtering sock according to the present invention and an auger apparatus for forming the same.

The present invention relates to a compost filter socks and more particularly to a hybrid filtration sock 30 and an auger based universal mobile field extrusion system 10 for insitu formation of the hybrid filtration sock 30 and for forming conventional compost filtration socks.

One aspect of the present invention is directed to a hybrid filtration sock 30 comprising a mesh tube filled with a blended filler comprising 60%-90% fibrous volumizing filler 12 and 10%-40% woody organic filler 14.

The method of forming the hybrid filtration sock 30 may best illustrate the present invention. Fibrous volumizing filler 12 is conveyed at 16 from a source of fibrous volumizing filler 12 to a hopper 20 of the system 10.

The fibrous volumizing filler 12 includes straw (defined broadly herein as the dried stalk of a plant, including grain straws such as wheat straw, barley straw, oat straw, and rye straw), grasses (including switchgrass and miscanthus), pine straw (AKA pine needles), corn stalks, natural fibers (such as flax, hemp, sisal, jute, kenaf, bamboo, coir, catgut, wool, alpaca hair, mohair, fique and rattan) and weeds and combinations thereof.

The woody organic filler 14 is conveyed at 18 from a source of woody organic filler 12 to a hopper 20 of the system 10.

The woody organic filler 14 is ground or chipped wood based material from land clearing, yard waste, pallets and clean wood debris or clean wood scraps, comprising a PH of between 5.0 and 8.0 at time of manufacture of the hybrid filtration sock, with a particle size wherein 99% passes a 2 in (50 mm) sieve and a maximum of 43% passes a ⅜ in (9.5 mm) sieve, and <3.5% by dry weight of inert or foreign man made materials. For example, a common woody organic filter is wood chipped to between ½" and 2" in particle size.

Figure 2A:
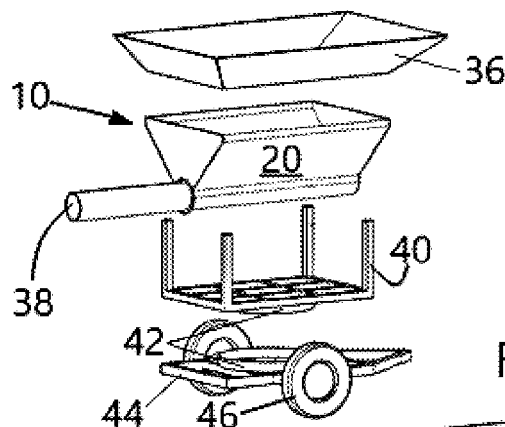
FIG. 2A is an exploded perspective view of universal mobile field extrusion system for insitu formation of the hybrid filtration sock according to the present invention and compost filtration socks in general.
Figure 2B:
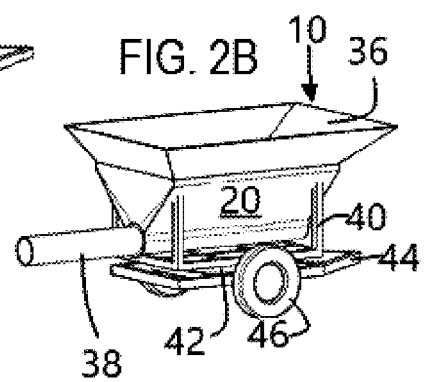
FIG. 2B is a perspective view of the universal mobile field extrusion system of FIG. 2A.
Figure 2C:
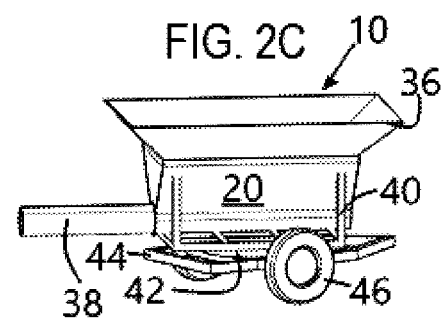
FIG. 2C is a perspective view of the universal mobile field extrusion system of FIG. 2B in a pivoted position.

The hopper 20 may be formed as a premixing hopper followed by a distributing hopper, or simply as a distributing hopper as shown in FIG. 1. FIGS. 2A-C show the inclusion of a hopper extension 36 that can be used to extend the hopper 20 as desired to support the receipt of more filler material therein and making it easier to form a "premixing hopper" due to increased space. A premixing hopper may include a mechanism to facilitate the mixing of the constituents, namely the fibrous volumizing filler 12 and the woody organic filler 14, such as a tumbler or added mixing device. A distributing hopper merely feeds the constituents, such as by gravity, to the next step in the process.

The hopper 20 may include devices to assist the feeding such as vibrators 22. The use of a gravity feed hopper 20 with vibration from vibrators 22 are sufficient to preliminary mix the fibrous volumizing filler 12 and the woody organic filler 14 for delivery to a conveying-mixing auger 24 driven by motor 26. The use of 10%-40% woody organic filler 14 in the hopper 20 for the blended mixture has yielded a transportable blend as compared with known fibrous filled compost filter socks of 100% fibrous volumizing filler 12 that have proved difficult to transport with the existing auger systems or with some existing pneumatic systems The auger 24 will convey and mix the fibrous volumizing filler 12 and the woody organic filler 14 to form a blended generally homogeneous mixture before it is deposited within the netting material 28 (or mesh tube 28 or mesh 28) to form the hybrid filtration sock 30 of the invention.

A sleeve of netting material 28 is on the outlet tube 38 of the conveying-mixing auger 24 and a leading end of the material 28 is pulled off of the outlet tube 38 and sealed at 32 by a tying mechanism or closing mechanism. Simply knotting the end is typically sufficient for forming the seal or closure 32, but bands, clips, fastener may be used as well. When a sufficient length of material 28 has been filled with the blended filler material and the hybrid filtration sock 30 of the invention is the desired length for the intended usage, then the proximal end will be sealed, generally in the same method as the closure 32. The sleeve of netting material 28 may be cut so that multiple hybrid filtration socks 30 may be formed from one sleeve of netting material 28 or the sleeve may be sized to form the necessary length of the hybrid filtration sock 30.

Where the sleeve of material 28 is cut to form multiple hybrid filtration socks 30 from one sleeve of netting material 28, the proximal end of one sleeve of netting material may be reached before the end of that desired length of the hybrid filtration sock 30 being formed, in which case the filling process is halted and a new sleeve is placed onto the outlet tube by feeding the outlet tube and the partially formed hybrid filtration sock 30 through the new sleeve of material 28. The leading end of the material 28 is overlapped with the trailing end of the prior sleeve while the trailing end is still on the outlet tube and the overlapped portions are coupled together such as with a few zip-ties or the like. With the new sleeve of material 28 thus positioned the process resumes.

The netting material 28, also called mesh tube 28, and is available from the applicant under the DIAMOND SOCK® brand. The netting sleeve material 28 can come in any conventional size, most typically circular cross sections of 6", 8", 10", 12", 18" and 24" being the most common. The mesh opening size can be of a variety of conventional sizes, of typically ⅛"-⅝", and preferably ⅛"-⅜", provided that the mesh openings are small enough to maintain the blended filler of the straw type filler 12 and the compost stock filler 14 within the constructed hybrid filtration sock 30 and large enough to allow runoff water to flow there through.

The mesh opening size is significant for a proper hybrid filtration sock 30 as if the openings are too small, the hybrid filtration sock 30 "blinds"; and if the openings are too big, the blended filler washes or falls out. The openings may be formed as a straight forward ⅛"-⅝" inch square, ⅛"-⅝" hex, or ⅛"-⅝" round. An elongated triangle for openings that are about ⅜" long, about ³⁄₁₆" wide at the fat end tapering to about ⅛" at the narrow end are quite effective openings for compost filter netting 28 for the hybrid filtration sock 30. For precision it is noted that for round openings the linear measurement given is normally of the diameter, or largest diameter for an oval. Similarly the linear measurement is generally the diameter for hexagon shaped openings and anything higher order than a rectangle (octagon, heptagon, etc). For a rectangle or a triangle shaped opening the linear measurement is typically associated with a major or longest side.

The netting sleeve material 28 of the hybrid filtration sock 30 is preferably formed of polyester or polypropylene or combinations thereof. Polyester and polypropylene netting materials are easily scalable and still allow the compost filter netting 28 to satisfy the requirements of compost filter netting set by every state requirement. For example, the requirements of compost filter netting set by the Pennsylvania Department of Environmental Protection, as of 2015, includes minimum requirements of "5 mil HDPE" (high density polyethylene) netting to be photodegradable, to have 8"-32" diameters, minimum mesh openings of ⅜", minimum tensile strength of 26 PSI, exhibit Ultraviolet stability of at least 23% original strength at 1000 hours (ASTM g-155 test), and have a minimum functional longevity of at least nine months.

Two specific examples of the present invention can demonstrate the advantages of the hybrid filtration sock 30 according to the present invention. The first is a ROAD WATTLE™ brand hybrid filtration sock 30 designed to be used to mark travel lanes, in particular entrance and exits, into construction areas. For this application, the hybrid filtration sock 30 needs to be easily movable but maintaining sufficient weight along the sock to minimize sock migration in use. Additionally the ROAD WATTLE™ brand hybrid filtration sock 30 should have water shedding aspects, be highly visible as well has having biodegradable filler material. For this embodiment, the mixture was 70% to 80%, and preferably 75%, pine straw forming the fibrous volumizing filler 12 and 20% to 30%, preferably 25%, wood chipped to between ½" and 2" in particle size forming the woody organic filler 14. The netting material 28 is a 6-10", preferably 8", polyester mesh tube with ⅛"-⅜" openings of a high visibility color (such as bright green, orange or yellow). The pine straw provides the water shedding aspects desired while maintaining the overall weight as reasonably manageable for easy use within travel lanes. The chipped wood provides the substance to prevent unwanted migration within the travel lanes in use. A 12' section would weigh about 45-50 lbs. The filler is 100% organic and degradable and the netting material 28 may have the desired degradation rate to allow the sock 30 to be left in the field following usage, put it remains light enough to remove and move as needed.

A second example of the present invention is known as the SWITCH SOCK® brand of hybrid filtration sock 30 and it is designed to be used areas which are intended to be reseeded with grass, such as across a sloped third party right of way/easement (consider where there is a gas line, water line or sewer line or the like being installed). In this type of application the post construction desire may often be to reseed the area with grass. Known fibrous filled compost filter socks, such as straw wattles, often fail to yield the water control properties desired for the site during construction, resulting in more control elements to be used. Known compost filter socks filled with woody organic fillers yield a different problem in that, unless these are later removed (which increases the costs of the system), then a large strip/mound of mulch remains that prevents grass to be grown in that area for several years. In other locations along a perimeter or in woods the mulch mounding is beneficial, but in this application it is a detriment. The SWITCH SOCK® brand of hybrid filtration sock 30 solves these drawbacks with the mixture being 60% to 70%, and preferably 65%, grasses (preferably miscanthus) forming the fibrous volumizing filler 12 and 30% to 40%, preferably 35%, wood chipped to between ½" and 2" in particle size forming the woody organic filler 14. The netting material 28 is a 10"-36", preferably 18-24", polyester mesh tube with ⅛-⅜" openings. The grasses both decrease the resulting wood chip mulch and facilitate the growth of grass therein while the blended mixture yields the water control properties desired (better than a straw wattle).

The hybrid filtration sock 30 comprising a mesh tube filled with a blended filler comprising 60%-90% fibrous volumizing filler 12 and 10%-40% woody organic filler 14 according to the invention allows specific hybrid filtration socks 30 to be designed for given applications and allows them to be easily manufactured to maintain a cost effective product.

FIGS. 2A-C highlight advantages in the universal mobile field extrusion system 10 for insitu formation of the hybrid filtration sock according to the present invention and compost filtration socks in general. Specifically existing mobile auger systems for compost filtration or filter socks have limited adjustability in the field resulting in considerable difficulty in some placement, particularly for large diameter conventional compost filter socks.

In the system 10 the hopper 20 is mounted on a hopper frame 40 supporting the hopper 10, motor 26, auger 24, outlet 38 and vibration devices 22. The hopper frame is supported on a cart frame 44 via a pivot ring 42 with the cart frame 44 supported on a single axle wheel pair 46. This construction yield a wide adjustability in the field. Specifically the pivot ring 42 allows the pivoting of the outlet 38 to position the end of the outlet 38 in a desired location for placement of the manufactured sock. In addition to the side to side adjustment yielded by the pivot ring 42, the single axle wheel pair 46 allows for some vertical adjustment to the end of the outlet 38. Specifically the skid steer attachment point of the cart frame 44 (opposite of the outlet 38) can be lowered or raised (screw jack mechanism, not shown) to adjust the height of the outlet 38. The vertical adjustment allows the system 10 to be easily utilized with a wide diameter of sock structures, as it is desired to have the outlet relatively close to the ground when manufacturing the sock, and the diameter of the commercial socks can vary considerably as noted above.

While the invention has been shown in several particular embodiments it should be clear that various modifications may be made to the present invention without departing from the spirit and scope thereof. The scope of the present invention is defined by the appended claims and equivalents thereto.

What is claimed is:

1. A method of forming a compost filter sock comprising the steps of:
   supplying filler material to a gravity feed distributing hopper wherein the filler material comprises 60%-90% fibrous volumizing filler and 10%-40% woody organic filler;
   feeding the filler material to a conveying mixing auger and homogenizing the 60%-90% fibrous volumizing filler and the 10%-40% woody organic filler within a tube surrounding the conveying mixing auger and conveying the filler material to a mesh tube along a path generally perpendicular to a feeding direction of the distributing hopper; and
   filling the mesh tube with the homogenized filler material which comprises 60%-90% fibrous volumizing filler and 10%-40% woody organic filler.

2. The method of forming a compost filter sock according to claim 1, further including the step of vibrating the gravity feed hopper during the feeding of the auger.

3. The method of forming a compost filter sock according to claim 1, wherein the hopper is mounted on a hopper frame, and wherein the hopper frame is supported on a cart frame via a pivot ring, and further including the step of adjusting the position of the auger through movement of the hopper frame relative to the cart frame via the pivot ring.

4. The method of forming a compost filter sock according to claim 1, wherein the cart frame is supported on a single axle wheel pair, and further including the step of vertically adjusting the auger by pivoting the cart frame about the single axle wheel pair.

5. The method of forming a compost filter sock according to claim 1, wherein the filler material comprises 70% to 80% fibrous volumizing filler.

6. The method of forming a compost filter sock according to claim 1, wherein the filler material comprises 60% to 70% fibrous volumizing filler.

7. The method of forming a compost filter sock according to claim 1, wherein the fibrous volumizing filler comprises grasses.

8. The method of forming a compost filter sock according to claim 7, wherein the grasses forming the fibrous volumizing filler comprises miscanthus.

9. The method of forming a compost filter sock according to claim 7, wherein the filler material comprises 70% to 80% fibrous volumizing filler.

10. The method of forming a compost filter sock according to claim 7, wherein the filler material comprises 60% to 70% fibrous volumizing filler.

11. The method of forming a compost filter sock according to claim 1, wherein the fibrous volumizing filler comprises pine straw.

12. The method of forming a compost filter sock according to claim 11, wherein the filler material comprises 70% to 80% fibrous volumizing filler.

13. The method of forming a compost filter sock according to claim 11, wherein the filler material comprises 60% to 70% fibrous volumizing filler.

14. A method of forming a compost filter sock configured for use in areas to be reseeded with grass, comprising the steps of:
    selecting a filler material which comprises a mixture of 60%-90% fibrous volumizing filler and 10%-40% woody organic filler;
    supplying the filler material to a gravity feed distributing hopper, wherein the filler material comprises 60%-90% fibrous volumizing filler and 10%-40% woody organic filler;
    feeding the filler material to a conveying mixing auger and homogenizing the 60%-90% fibrous volumizing filler and the 10%-40% woody organic filler within a tube surrounding the conveying mixing auger and conveying the filler material to a mesh tube along a path generally perpendicular to a feeding direction of the distributing hopper; and
    filling the mesh tube with the homogenized filler material comprising comprises 60%-90% fibrous volumizing filler and 10%-40% woody organic filler.

15. The method of forming a compost filter sock according to claim 14, wherein the fibrous volumizing filler comprises grasses.

16. The method of forming a compost filter sock according to claim 15, wherein the grasses forming the fibrous volumizing filler comprises miscanthus.

17. The method of forming a compost filter sock according to claim 14, wherein the fibrous volumizing filler comprises pine straw.

18. The method of forming a compost filter sock according to claim 17, wherein the filler material comprises 70% to 80% fibrous volumizing filler.

19. The method of forming a compost filter sock according to claim 17, wherein the filler material comprises 60% to 70% fibrous volumizing filler.

* * * * *